United States Patent … US 7,201,323 B2
Kotovich et al. (45) Date of Patent: Apr. 10, 2007

(54) SYSTEM AND METHOD FOR CHECK FRAUD DETECTION USING SIGNATURE VALIDATION

(75) Inventors: Nikolay Kotovich, Moscow (RU); Grigori Nepomniachtchi, San Diego, CA (US)

(73) Assignee: Mitek Systems, Inc., San Diego, CA (US)

(*) Notice: Subject to any disclaimer, the term of this patent is extended or adjusted under 35 U.S.C. 154(b) by 0 days.

(21) Appl. No.: 11/008,893

(22) Filed: Dec. 10, 2004

(65) Prior Publication Data

US 2006/0124724 A1 Jun. 15, 2006

(51) Int. Cl.
G06K 19/00 (2006.01)
G06K 9/00 (2006.01)
B42D 15/00 (2006.01)

(52) U.S. Cl. ............ 235/487; 382/119; 283/58
(58) Field of Classification Search ........ 235/487; 382/119; 283/58
See application file for complete search history.

(56) References Cited

U.S. PATENT DOCUMENTS

| 3,781,109 A * | 12/1973 | Mayer et al. ............ 355/52 |
| 4,101,959 A | 7/1978 | Domike et al. |
| 4,364,024 A | 12/1982 | Paetsch |
| 4,985,928 A | 1/1991 | Campbell et al. |
| 5,257,320 A * | 10/1993 | Etherington et al. ........ 382/119 |
| 5,326,136 A | 7/1994 | Doyle |
| 5,490,217 A * | 2/1996 | Wang et al. ............ 380/51 |
| 5,509,692 A | 4/1996 | Oz |
| 5,544,255 A | 8/1996 | Smithies et al. |
| 5,602,933 A | 2/1997 | Blackwell et al. |
| 5,647,017 A | 7/1997 | Smithies et al. |
| 5,668,897 A | 9/1997 | Stolfo |
| 5,677,955 A | 10/1997 | Doggett et al. |
| 5,818,955 A | 10/1998 | Smithies et al. |
| 5,838,814 A | 11/1998 | Moore |
| 5,909,500 A | 6/1999 | Moore |
| 5,910,988 A | 6/1999 | Ballard |
| 5,930,380 A * | 7/1999 | Kashi et al. ............ 382/119 |
| 6,064,751 A | 5/2000 | Smithies et al. |
| 6,091,835 A | 7/2000 | Smithies et al. |
| 6,195,452 B1 | 2/2001 | Royer |
| 6,381,344 B1 | 4/2002 | Smithies et al. |
| 6,424,728 B1 | 7/2002 | Ammar |
| 6,694,045 B2 * | 2/2004 | Chung et al. ............ 382/119 |
| 6,711,554 B1 | 3/2004 | Salzmann et al. |
| 2002/0052852 A1 | 5/2002 | Bozeman |
| 2003/0219122 A1 | 11/2003 | Ramirez et al. |
| 2004/0138955 A1 | 7/2004 | Song et al. |
| 2004/0156537 A1 | 8/2004 | Chung et al. |

* cited by examiner

Primary Examiner—Michael G. Lee
Assistant Examiner—Jamara A. Franklin
(74) Attorney, Agent, or Firm—David E. Heisey; Sheppard Mullin Richter & Hampton LLP

(57) ABSTRACT

Systems and methods are provided for validating the authenticity of a signature on a document by providing a document from an account, the document including an actual signature and a machine-readable identifier, wherein the machine-readable identifier contains a string of data representing the integral characteristics of all valid account signatures and a person-specific confidence threshold. When the document is presented at a point of presentment, the document is scanned into a document-processing machine and the actual signature is compared against all valid account signatures.

18 Claims, 4 Drawing Sheets

SYSTEM AND METHOD FOR CHECK FRAUD DETECTION USING SIGNATURE VALIDATION

FIELD OF THE INVENTION

This invention relates to automated document processing, and more particularly to automatic processing of financial documents involving image-based signature verification.

BACKGROUND OF THE INVENTION

In general, financial institutions have automated most check processing systems by printing financial documents, such as account numbers and bank routing numbers onto the checks. Before a check amount is deducted from a payer's account, the amount, account number, and other important information must be extracted from the check. The highly automated form of extraction is done by a check processing control system that captures information from the Magnetic Ink Character Recognition ("MICR") line. The MICR line consists of specially designed numerals that are printed on the bottom of a check using magnetic ink. The MICR data fields include the bank routing number, bank transit number, account number, check serial number, check amount, process code and extended process code.

Check fraud is one of the largest challenges facing financial institutions today. Advances in counterfeiting technology have made it increasingly easy to create realistic counterfeit checks used to defraud banks and other businesses. Image-based check processing systems play a crucial role in check fraud detection software programs by extracting and verifying various check features that can be found on the check image. In order to be verifiable, an image feature should be either consistent across all check images from the same account, or cross-verifiable against another feature on the same check.

Conventional methods of reducing check fraud include providing watermarks on the checks, fingerprinting non-customers that seek to cash checks, positive pay systems and reverse positive pay systems. Positive pay systems feature methods in which the bank and its customers work together to detect check fraud by identifying items presented for payment that the customers did not issue. With reverse positive pay systems, each bank customer maintains a list of checks issued and informs the bank which checks match its internal information. Although these check fraud security systems have been somewhat effective in deterring check fraud, they suffer from a multiplicity off drawbacks. For example, these systems are generally very slow and prohibitively expensive.

U.S. Pat. No. 5,257,320 discloses a signature verification system wherein, a check is scanned for an actual signature and a corresponding code located on the face of the check. The scanned data is converted into digital form and a software program is used to compare the signature to the code. A pass-fail light is then employed to indicate the result of the comparison. U.S. Pat. No. 5,509,692 teaches a system and method for point of presentation signature verification for a monetary instrument such as a check, wherein the front face of the check comprises a machine-readable representation of an authorized signature. At a point of presentment, the check is scanned and the actual signature on the check is manually or automatically compared with the machine-readable representation of the authorized signature, and a similarity score is generated One drawback of the above-identified signature verification systems is that they do not involve a compression of account signature data to a fingerprint containing only a small fraction of the account signature data. These references also fail to disclose methods of determining person-specific confidence thresholds by evaluating the complexity and topology of account signatures. In addition, these references provide preprocessing of the signature and extraction features from the signature bitmap rather than applying a signature skeletonization technique, and then extracting features from the signature skeleton. A further drawback of the above-identified systems is that they assume a fixed-size signature representation.

In view of the above drawbacks, there exists a need for a system and method for check fraud detection using signature validation that involves a compression of account signature data to a fingerprint containing only a small fraction of the account signature data.

There further exists a need for a system and method for check fraud detection using signature validation that involves determining person-specific confidence thresholds by evaluating the complexity and topology of account signatures.

It would also be desirable to provide a system and method for check fraud detection using signature validation that involves applying a signature skeletonization technique, and then extracting features from the signature skeleton.

It would further be desirable to provide a need for a system and method for check fraud detection using signature validation does not assume any particular size of the signature.

SUMMARY OF THE INVENTION

In view of the forgoing, it is an object of the present invention to provide a system and method for check fraud detection using signature validation that involves a compression of account signature data to a fingerprint containing only a small fraction of the account signature data.

It is a further object of the invention to provide a system and method for check fraud detection using signature validation that involves determining person-specific confidence thresholds by evaluating the complexity and topology of account signatures.

It is an additional object of the invention to provide a system and method for check fraud detection using signature validation that involves applying a signature skeletonization technique, and then extracting features from the signature skeleton.

It is yet another object of the invention to provide a system and method for check fraud detection using signature validation does not assume any particular size of the signature.

The present invention provides a system and method of image-based fraud detection for checking the authenticity of a signature on a financial document such as a check. The system and method preferably are implemented using computer software programs comprising machine readable instructions for detecting fraudulent checks and verifying non-fraudulent checks. Advantageously, the system and method of the present invention may be employed to validate signatures and detect check fraud at various points of presentment, for example at teller stations or at retail stores.

One aspect of the present invention features signature encoding software for creating a unique "fingerprint," encoding the fingerprint into a barcode and printing the barcode onto a series of checks. The fingerprint preferably comprises a string of data representing the integral characteristics of all valid account signatures and a person-specific confidence threshold. According to some embodiments, the fingerprint comprises a machine-readable data string of about 100 bytes of data or less. A fingerprint is created using a signature encoding algorithm that converts the signature image into the machine-readable data string. Additional fingerprints may be included in the data string corresponding to further authorized individuals. In this manner, the data string is the master data source against which all signatures from this account will be compared.

Another aspect of the present invention involves validating the authenticity of a signature on a document by creating a fingerprint comprising machine-readable data corresponding to authorized account signatures, the fingerprint comprising a skeletonized version of the account signature data. Further steps involve providing a document from an account, the document including an actual signature and a fingerprint, presenting the document at a point of presentment, scanning the document, including the actual signature and the fingerprint, into a document-processing machine and comparing the actual signature against the account signature data in the fingerprint.

A further aspect of the present invention involves encoding a document with account signature data for signature validation comprising compressing the account signature data into a fingerprint comprising machine-readable data corresponding to one or more account signatures such that the fingerprint contains only a small fraction of the account signature data, encoding the fingerprint into a barcode and printing the barcode on the document. The fingerprint represents integral characteristics of all valid account signatures and may identify a person-specific confidence threshold for each account user. According to some embodiments, the fingerprint comprises 100 bytes of data or less.

An additional aspect of the present invention involves encoding a document with account signature data for signature validation comprising compressing the account signature data to a fingerprint comprising machine-readable data corresponding to one or more account signatures, evaluating the complexity and topology of each account signature, encoding the fingerprint into a barcode and printing the barcode on the document. This aspect may further involve determining a person-specific confidence threshold for each account signature based upon the complexity and topology of each account signature.

Yet another aspect of the present invention involves locating one or more signatures on a check comprising receiving an original or preprocessed check bitmap, dividing the check bitmap into fixed-size tiles, sorting the tiles into predefined classes, identifying handwriting tiles, adjusting the signature positions using a connected components analysis and generating final signature locations. Sorting the tiles into predefined classes may include applying neural network classifiers to the tiles.

A further aspect of the present invention involves locating one or more signatures on a check, comprising receiving an original or preprocessed check bitmap having a predetermined signature default area, determining the location of one or more check layout elements, using the location of the one or more check layout elements to determine potential signature locations and employing a handwriting detection technique to detect the present or absence of handwriting in the potential signature locations.

BRIEF DESCRIPTION OF THE DRAWINGS

These and other features and advantages of the invention will become more apparent upon reading the following detailed description and upon reference to the accompanying drawings.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention provides a system and method of image-based fraud detection for checking the authenticity of a signature on a financial document such as a check by signature validation. The system and method preferably are implemented using computer software programs comprising machine readable instructions for creating a data string corresponding to an authorized account user and checking subsequent signatures against the data string. According to some embodiments, the computer software is adapted to be installed on a personal computer running a Microsoft Windows or other operating system.

Figure 1:
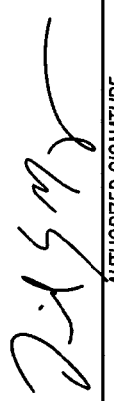
FIG. 1 illustrates a financial document having a machine-readable barcode.

Referring to FIG. 1, financial documents such as checks commonly undergo automated processing. Check 100 includes amount field 105, signature field 110, and a barcode 115. When the check is received by a financial institution, it is processed to ensure the proper amount of money is debited from the proper account. The location of the fields in the check 100 is determined by banking regulations. These regulations ensure, for example, that the amount field 105 and the barcode 115 are in the same location for each check 100 regardless of which institution issued the check 100. By regulating the location of this information, automated systems can be used to process the checks 100.

According to an aspect of the present invention, signature encoding software is employed (e.g., by a bank) to: (1) analyze the signatures on an account; (2) create a unique "fingerprint" for one or more signatures on the account; and (3) encode the fingerprint into a barcode such as barcode 115. After encoding the fingerprints, the barcodes preferably are sent to a printer for check stock printing with embedded barcode information created by the signature encoding software. The fingerprint preferably comprises data corresponding to one or more unique account signatures corresponding to each authorized account user.

According to a preferred embodiment, the fingerprint only includes data corresponding to a small fraction of the actual account signatures. More particularly, the fingerprint comprises a machine-readable data string, preferably about 500 bytes or less, most preferably about 100 bytes of data or less. By contrast, if data matching the entire account signatures were to be encoded, the resulting fingerprint would comprise thousands (or perhaps millions) of bytes of data. According to some embodiments, fingerprints are created using a signature encoding algorithm that converts signature images into a machine-readable data string. For an added degree of security, the signature encoding algorithm may be different for different accounts.

According to another aspect of the present invention, signature validation software is embedded into one or more devices at various points of presentment. Points of presentment include, but are in no way limited to, bank teller stations, retail checkout lines, and grocery store checkout lines. One suitable point of presentment device is a point of sale (POS) scanner, which preferably is adapted to: (1) scan a check and read the barcode; (2) extract a signature-related portion of the barcode data; (3) validate the actual signature against information stored in the barcode; and (4) display an alert if the signature is deemed illegitimate. Advantageously, such POS scanners do not require a network connection to determine the authenticity of a check.

When banking customers order check stock (e.g., at a bank), the signature encoding software of the present invention is used to analyze the signatures on the account and create a unique barcode. In a preferred embodiment, the barcodes are two-dimensional barcodes adapted to meet the PDF417 standard, which is a multi-row, variable length barcode symbol having high capacity and error correction. This standard is capable of encoding more than 1,100 bytes, 1,800 ASCII characters or 2,700 digits depending on the data compaction mode. Additionally, PDF417 supports full ASCII character including extended character set.

There currently exist three configurations of PDF417, namely: (1) Standard (which is the base of all PDF417 extended versions); (2) Macro and (3) Truncated. In operation, the unique barcode is sent (along with the customer and check stock information) to the printer for printing. The printer then prints the check stock with the embedded barcode and distributes the checks to the appropriate bank customers. When one of the checks is subsequently presented, it is scanned by a POS scanner, which analyzes the signature and compares it with the information stored in the barcode. If the signature does not match the information, the scanner alerts the user that the check could be fraudulent.

According to a preferred embodiment, one or more actual signatures of an authorized individual are used to create a single 100-byte string of data for a given account. This data string comprises a fingerprint that is the master data source against which all signatures from the account will be compared. The account's unique barcode preferably includes the data string for signature validation. One or more images of a valid account signatures are scanned into the system using a scanner and a corresponding 100-byte fingerprint is computed.

When a check is presented, for example at a retail store, it is scanned into a POS scanner having the signature validation software of the present invention installed thereon. At this point, the signature validation software automatically locates the actual signature on the check and makes a comparison between the actual signature and the valid account signature(s) (i.e., the 100-byte data string located on the barcode for that account). The software preferably is adapted to output a confidence value indicating whether the actual signature is an authentic signature. The signature validation software preferably automatically locates the actual signature on a check when the check is scanned into a POS scanner.

According to a preferred implementation of the invention, the signature validation software utilizes a plurality of techniques to more accurately and precisely locate the signatures on various checks. Such techniques include, but are not limited to: (1) the use of a predefined default area on the check; (2) the use of an adjusted predefined default area on the check; and (3) the use of a handwriting detection technique. The use of a predefined default area on the check is the most basic of these signature location techniques. This approach is suitable for personal checks since most personal checks contain a signature area in a known location. However, personal checks having abnormalities (e.g., the presence of a second MICR line) may occasionally produce spurious results on personal checks. The use of a predefined default area is not particularly suitable for business checks, which tend to vary dramatically in size and signature location.

The use of an adjusted predefined default area on the check is a more robust approach that permits an adjustment of the default area based upon an analysis of the location of one or more check layout elements, such as MICR lines, signature underlines and micro-print inscriptions. The signature validation software of the present invention is advantageously adapted to precisely locate MICR lines on both personal and business checks. In addition, the software is adapted to precisely locate signature underlines and micro-print inscriptions on both personal and business checks. The precise locations of these check layout elements are indicative of the location of the actual signature(s) on the check.

The signature validation software of the present invention also features a handwriting detection technique adapted to locate any handwriting that is present on the front face of the check. This handwriting detection technique provides the most accurate and precise location of actual signature(s) on both personal and business checks. According to a preferred embodiment, the software of the present invention uses a combination of the signature location techniques. By way of example, most business checks contain more than one signature position. The adjusted default area technique may be used to detect the potential signature positions (e.g., the identification of two signature underlines indicates the presence of two potential signature areas). After the detection of potential signature areas, the handwriting detection technique of the present invention may be used to detect the present or absence of handwriting in the potential signature areas.

Figure 2:
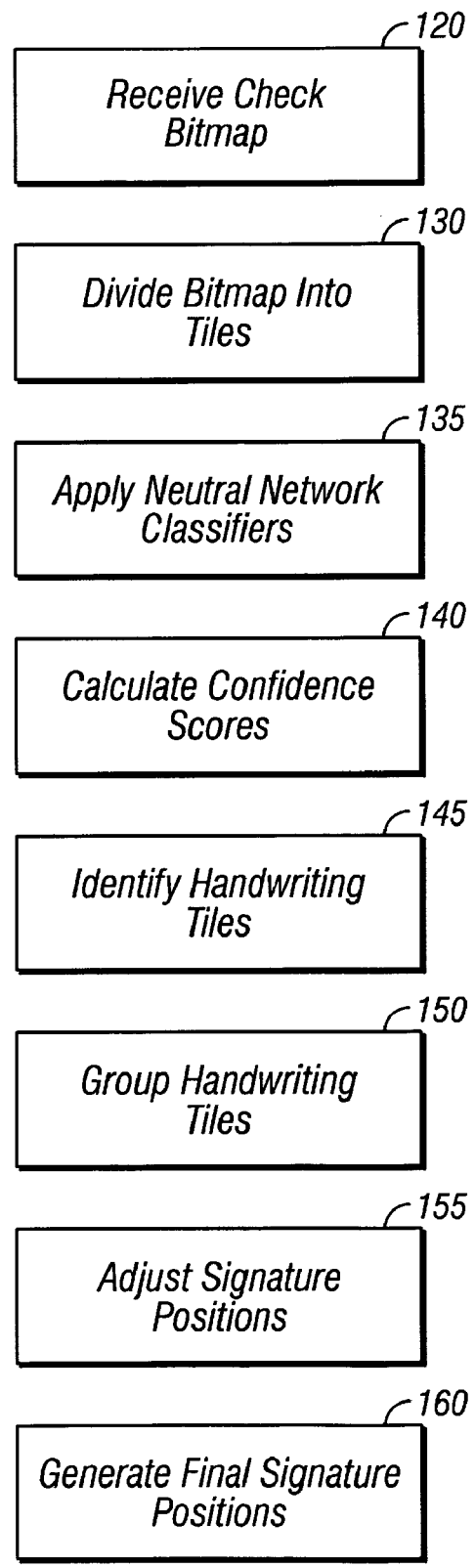
FIG. 2 is a flowchart for a method of determining the location of one or more signature on a document according to the principles of the present invention.

According to a preferred embodiment of the invention, the handwriting detection technique generates final signature locations according to the following method. Referring to FIG. 2, step 120 involves receiving the original or preprocessed check bitmap. The next step (step 130) involves dividing the bitmap into fixed-size tiles (e.g., 32×32 or 64×64). Step 135 involves applying neural network classifiers to sort tiles into the predefined classes. Such classes may include printed text, cursive text, handwritten text, graphics, picture and icon. The next step (step 140) involves calculating a confidence score for each classification (e.g., a confidence score of 0.99 may indicate a 99 percent chance the classification being correct).

After confidence scores have been calculated, the next steps involve identifying handwriting tiles (e.g., tiles that contain printed text, cursive text and/or handwritten text) (step 145) and grouping the handwriting tiles using a cluster analysis technique (step 150). According to the cluster analysis technique, clusters of handwriting represent possible signature locations. The method may also involve reviewing other tiles that have been classified as graphics and selectively adding some of these tiles to the signature clusters. The next steps involves adjusting the signature positions using connected components analysis (step 155) and generating final signature locations (step 160).

In accordance with the principles of the present invention, the following features of the signature validation software will now be described: (1) initial (uncompressed) features used for signature validation; (2) compressed features (i.e., the signature fingerprint) used for signature validation; (3) a method for comparing the feature vectors of a signature; (4) a method for topological analysis of the signature; (5) a method for evaluating the complexity of signature; (7) a method for evaluating the variability of the same person's signatures; and (8) a method for computing a person-specific confidence threshold.

Figure 3:
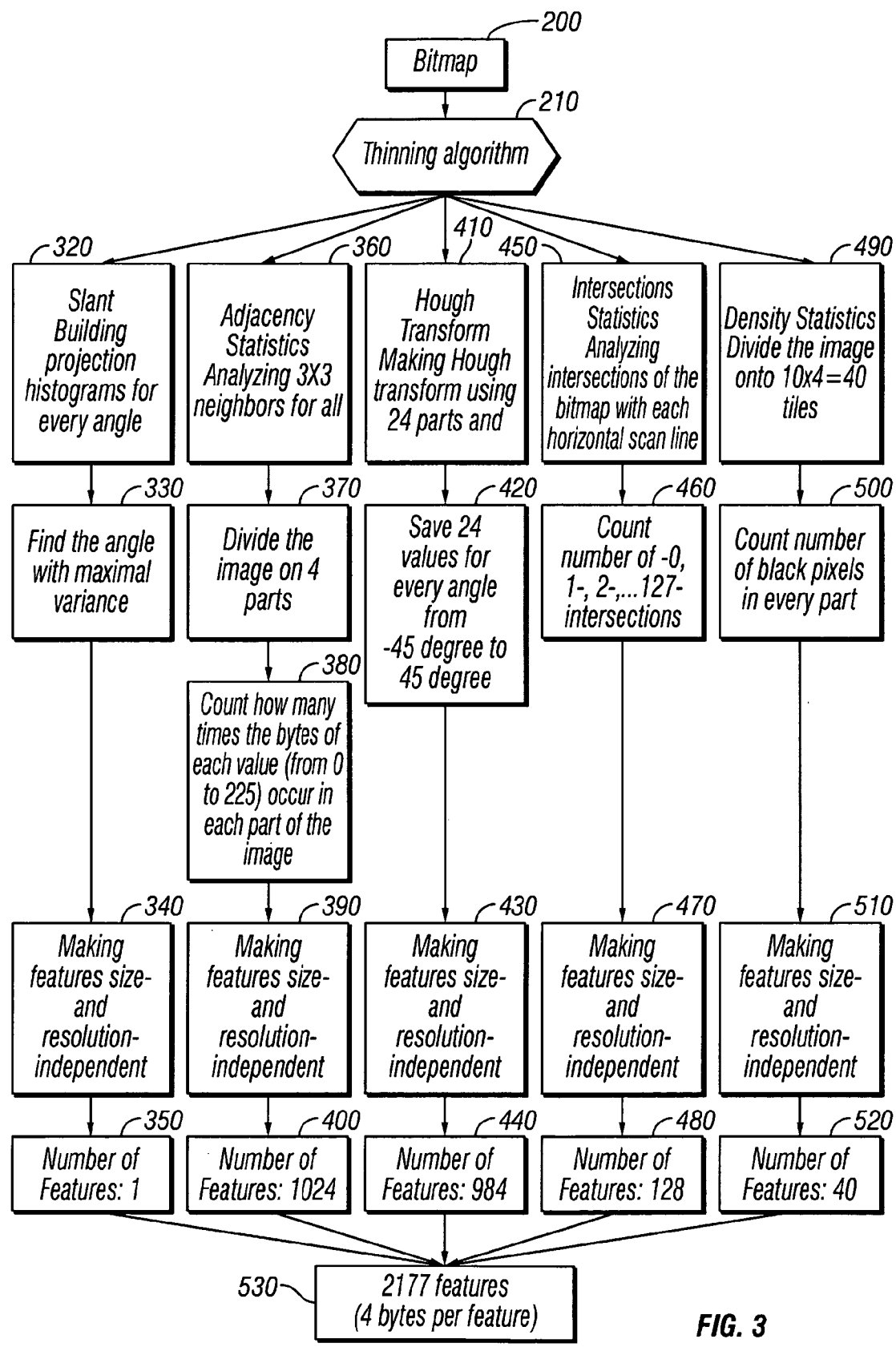
FIG. 3 is a flowchart depicting the computation of initial uncompressed features used for signature validation in accordance with the principles of the present invention.

Referring to FIG. 3, a flowchart depicting the computation of initial uncompressed features used for signature validation is provided. In the illustrated embodiment, the initial features comprise slant, adjacency statistics, Hough Transform, intersections statistics and density statistics. Referring to step 200, a bitmap of one or more account signatures is initially provided. Once the signature is detected, its image is cropped from the check image to produce a signature snippet. In step 210, a thinning algorithm is employed to build a one-dimensional "skeleton" of the signature.

The thinning algorithm used for skeletonization produces a one-dimensional graph that is particularly suitable for feature extraction. Instead of merely analyzing the raw signature bitmap, the thinning algorithm is first applied to create the signature skeleton, and then selected features are extracted from the skeleton. One advantage of this approach is that it combines both raster and vector (graphic) signature description. The skeleton may be further preprocessed (e.g., smoothed) to make the graph less dependent on the random variations of the signature. After building the one-dimensional skeleton, the signature is analyzed for slant, adjacency statistics, Hough Transform, intersections statistics and density statistics.

With respect to slant, step 320 involves building a projection histogram (array of integer values Hist) for each angle within a reasonable range with 0.1-degree increment. Given the projection angle A, each black pixel P on the signature bitmap increments Hist [Q] by 1, where Q is the position onto which the pixel P has been projected. Given the projection angle A, the next step involves counting the variance Var (the square of the standard deviation), wherein:

(1) Sum=ΣHist [Q] (over all Q values);

(2) SumSq=Σ(Hist [Q]*Hist [Q]) (over all Q values); and (3) Var=(SumSq−((Sum*Sum)/N))/N, where N is the number of Q-values Step 330 involves locating and selecting the angle for which the variance assumes a maximal value. Step 340 involves normalizing the generated arrays to be size- and resolution-independent. As depicted in box 350, the total number of slant features is 1.

With respect to adjacency statistics, an initial step (step 360) comprises computing a "neighborhood byte" for every black point, wherein:

(1) Initial value of the byte is 0;

(2) Set bit #0 in the byte to 1 if the pixel has neighbor in the left direction; and (3) Set bit #1 in the byte to 1 if the pixel has neighbor in the right direction and so on using the "pre-assigned" bit for all 8 directions (including diagonals).

According to some embodiments, the step of computing the neighborhood byte includes the step of analyzing 3×3 neighbors for each black point. The resulting neighborhood byte is a value from 0 to 255. The next steps involve dividing the image into 4 parts (step 370) and counting the number of times that each possible neighborhood byte value (from 0 to 255) has occurred in each part (step 380). Step 390 involves normalizing the generated arrays to be size- and resolution-independent. Referring to box 400, the distribution for each part is represented by a 256-element array of integer value (that latter occupies 4 bytes in memory), such that the total number of features in the adjacency statistics is 1024 (256*4).

With respect to building a Hough Transform group, an initial step (step 410) comprises dividing the signature bitmap in the horizontal direction into 24 parts. Step 420 involves obtaining projections of the image on the 24 parts, for example using 41 angle values from −45° to 45°. Step 430 involves normalizing the generated arrays to be size- and resolution-independent. Referring to box 440, since each projection is represented by a 24-component vector, the total number of features in the Hough Transform group is 984 (41*24). With respect to building intersections statistics, an initial step (step 450) involves counting the number of intersections (with black pixels) for each scan line of the signature bitmap.

With further reference to FIG. 3, step 460 involves counting the number of scan lines having exactly 0 intersections, 1 intersection, 2 intersections, 3 intersections, etc. According to some embodiments, the maximum number of intersections is selected to be 127 such that the intersections statistics are represented by 128 features (box 480). Step 470 involves normalizing the generated arrays to be size- and resolution-independent. With respect to building density statistics, an initial step (step 490) comprises dividing the image into 10 parts horizontally and 4 on parts vertically, thereby producing a total of 40 tiles or features. Step 500 involves counting the number of black pixels in each tile. Step 510 involves normalizing the generated arrays to be size- and resolution-independent. As depicted in box 520, the total number of density statistics features is 40. Referring to box 530, the total number of initial features is 2177 with 4 bytes per feature.

According to another aspect of the present invention, the initial features are compressed by selecting only the most informative features, thereby preferably reducing the fingerprint to about 500 bytes or less, most preferably about 100 bytes of data or less. To achieve the desired data reduction, a signature verification testing environment including a test deck and testing utilities was built. Various testing was performed, including: (1) experimenting with the number of parts that a signature should be segmented into; (2) applying various statistical analyses to the test results, given that the final set of features should contain 100 bytes or less; (3) selecting the most useful and informative features; and (4) optimizing the feature weights within an overall confidence score produced by the system.

Figure 4:
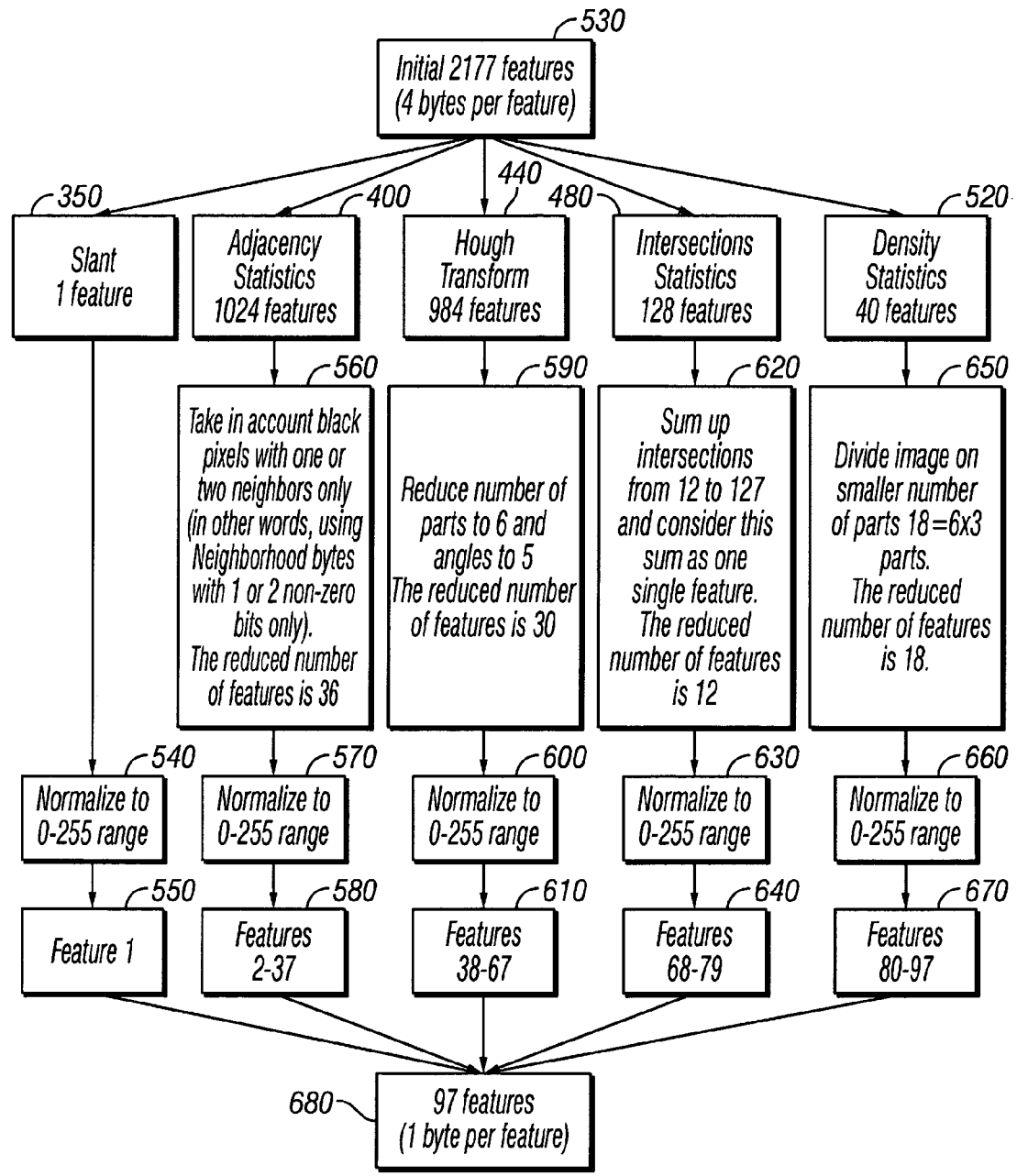
FIG. 4 is a flowchart depicting the computation of compressed features used for signature validation in accordance with the principles of the present invention.

Referring to FIG. 4, a flowchart depicting the computation of compressed features (i.e., slant, adjacency statistics, Hough Transform, intersections statistics and density statistics) used for signature validation is provided. Referring to box 530, the total number of initial features is 2177 with 4 bytes per feature, wherein: (1) the total number of slant features is 1 (box 350); (2) the total number of adjacency statistics features is 1024 (box 400); (3) the total number of Hough Transform features is 984 (box 440); (4) the total number of intersections statistics features is 128 (box 480); and (5) the total number of density statistics features is 40 (box 520). Regarding slant features, in step 540 the generated arrays are again normalized to be size- and resolution-independent. Referring to box 550, the total number of compressed slant features remains 1.

With respect to adjacency statistics features, step 560 comprises reducing the number of adjacency statistics by only accounting for black pixels having 1 or 2 neighbors (i.e., using only neighborhood bytes with 1 or 2 non-zero bits). This compresses or reduces the number of adjacency statistics features from 1024 to 36. In step 570, the generated arrays are normalized to be size- and resolution-independent. Referring to box 580, the total number of compressed adjacency statistics features is 36 and a running total of compressed features is from 2 to 37. Regarding Hough Transform features, step 590 involves reducing the number of parts to 6 and reducing the number of angles to 5, thereby compressing the number of features from 984 to 30. In step 600, the generated arrays are normalized to be size- and resolution-independent. Referring to box 610, the total number of compressed adjacency statistics features is 30 and a running total of compressed features is from 38 to 67.

With respect to intersections statistics features, step 620 comprises reducing the number of intersections statistics by summing the intersections from 12 to 127 and considering the sum as a single feature. This compresses the number of intersections statistics features from 128 to 12. In step 630, the generated arrays are normalized to be size- and resolution-independent. Referring to box 640, the total number of compressed intersections statistics features is 12 and a running total of compressed features is from 68 to 79. Regarding density statistics features, step 650 involves dividing the image on a smaller number of parts (18=6×3), thereby compressing the number of features from 40 to 18. In step 660, the generated arrays are normalized to be size- and resolution-independent. Referring to box 670, the total number of density statistics features is 18 and the total number of compressed features is from 80 to 97. Referring to box 680, the total number of compressed features is 97 with 1 byte per feature.

According to the principles of the present invention, the feature vectors may be analyzed and compared using the following formulae, wherein weighted distances are used to compare the feature vectors. Given two feature vectors F={f1, . . . , f97} and G={g1, . . . , g97}, the distance D=D(F, G) between the vectors is defined as:

$$D = w1 * abs(g1 - f1) + w2 * \sum_{i=2}^{9} abs(gi - fi) + w3 * \sum_{i=10}^{37} abs(gi - fi) +$$
$$w4 * \sum_{i=38}^{67} abs(gi - fi) + w5 * \sum_{i=68}^{79} abs(gi - fi) + w6 * \sum_{i=80}^{97} abs(gi - fi).$$

According to some embodiments, the following weighting coefficients are employed: w1=2, w2=10, w3=20, w4=2, w5=10, w6=20. The confidence (likelihood) of F and G representing the signatures of the same person is defined as C=max(0, 100−(D/128)). If confidence C is greater than a predetermined threshold, the two signatures are deemed to belong to the same person. Otherwise, the signatures are deemed to belong to different persons. Methods for computing person-specific confidence thresholds are described herein.

A further aspect of the present invention involves a method of analyzing of the topological features of a signature to assist in evaluating the complexity of a signature. Such a method may comprise one or more of the following steps: (1) computing the number of connected components in the signature; (2) computing the number of holes in the components; (3) computing the sizes of the components and sizes of the holes; (4) using a thinning algorithm to build a 1-dimensional "skeleton" of the signature (note that most black pixels have two black neighbors after thinning, whereas some pixels have only one neighbor ("tails"), while other pixels have 3 or 4 neighbors ("branches")—such points are "critical" and the number of neighbors is the topological index of the critical point; (5) building a list of all critical points, preferably including positions and topological indices; (6) building a description of every component as a list of critical points; and (7) for each pair of adjacent critical points, adding a description of the "path" that connects the points inside the skeleton (note that the path parameters are length, instant directions at the beginning and the end of the path, global direction and curvature).

In accordance with an additional aspect of the present invention, the topological features of a signature are used in evaluating the complexity of the signature for computing person-specific confidence thresholds. Overall complexity of a particular signature is a function of the topological features, which may be analyzed as described in the preceding paragraph. The following topological features (F1–F7) have the greatest impact on the complexity: (1) the number of connected components (F1, determined by computing the number of connected components in the signature); (2) the number of holes in connected components (F2, determined by computing the number of holes in the components); (3) the size of connected components (F3, determined by computing the sizes of the components and sizes of the holes); (4) the number of critical points with a topological index of 1 (F4, determined by building a list of all critical points including positions and topological indices and building a description of every component as a list of critical points); (5) the number of critical points with a topological index of 3 (F5, see F4); (6) the number of critical points with a topological index of 4 (F6, see F4 and F5); and (6) the average curvature between adjacent critical points (F7, determined by adding a description of the path that connects the points inside the skeleton for each pair of adjacent critical points). According to a preferred embodiment of the present invention, a weighted sum of features is used to represent the signature complexity, wherein: C=ΣW$_i$*F$_i$(I=1–7), where Fi are features F1 to F7.

In accordance with another aspect of the present invention, a method of assessing signature variability for computing person-specific confidence thresholds is provided. Of course, more than one actual signature must be available in order to measure signature variability. According to a preferred embodiment, at least 5 actual signatures are used to assess signature variability. An initial step comprises building a feature vector for each signature for each account user, for example as described hereinabove with respect to FIGS. 2 and 3. In this manner, feature vectors F$_1$, F$_2$, . . . F$_N$, are calculated for each account user, wherein N is the number of signatures. The next step involves computing confidences C(i,j)=C(Fi, Fj) for each pair of different signatures {I<J), as described hereinabove. The next step involves computing the standard deviation within the following set of confidences:

(1) Sum=$\Sigma C(I,J)$ (over all I<J);
(2) SumSq=$\Sigma(C(I,J)*C(I,J))$ (over all I<J);
(3) Var=(SumSq−((Sum*Sum)/P))/P, where P is the number of pairs with I<J: P=N*(N−1)/2, where N is the number of signatures; and
(4) V=sqrt (Var), where V is the standard deviation used to represent the variability in question.

Once the signature variability and average signature complexity have been determined, one can compute a person-specific confidence threshold, wherein:

(1) Threshold=AveThr−W1*ComplexityDelta−W2*VariabilityDelta;
(2) where AveThr is the average threshold value, experimentally established as 67 (on a 0–100 scale);
(3) where ComplexityDelta is computed as (C−AveComplexity), where AveComplexity is average complexity of signatures (established experimentally);
(4) where VariabilityDelta is computed as (V−AveVariability), where AveVariability is average variability of the same person's signatures (established experimentally); and
(5) where the weights W1 and W2 are some positive values that are established experimentally according to the trade-off between false positive and false negative rates.

The above-described person-specific confidence threshold formula will now be considered in view of the following cases. In the case where both deltas are approximately 0, the particular account user has a substantially standard signing style, wherein Threshold is approximately equal to AveThr. In the case where ComplexityDelta is approximately 0, but the VariabilityDelta is substantially greater than 0, the account user has no established signing style such that the signatures do not closely match each other. Since W2 is a positive value preceded by a minus sign, the Threshold will become less than AveThr. Thus, to avoid too many false rejections of this user's signature (due to the high variability), the person-specific confidence threshold should be lowered in this instance. In the case where ComplexityDelta is approximately 0, but the VariabilityDelta is much smaller than 0, the account user has a well established signing style and the signatures very closely match each other). Since W2 is a positive value preceded by minus sign, the Threshold will become greater than AveThr. Thus, the person-specific confidence threshold may be increased to reduce the number of false acceptances (false positive decisions), yet not significantly increase the occurrence of false negative decisions.

In the case where VariabilityDelta is 0, but ComplexityDelta is much greater than 0, the account user has a very complex signature. Since W1 is a positive value preceded by minus sign, the Threshold will become smaller than AveThr. In this example, to avoid too many false rejections (false negative decisions) of this user's signature because of the high complexity, the person-specific confidence threshold should be lowered. However, the chance of a false positive decision doesn't increase much since the signature is complex and therefore difficult to forge. In the case where VariabilityDelta is 0, but the ComplexityDelta is much smaller than 0, the person has very simple signature. Since W1 is a positive value preceded by minus sign, the Threshold will become greater than AveThr. In this example, the person-specific confidence threshold should be increased to reduce the number of false positive decisions since the signature is simple and therefore easy-to-forge. Increase the threshold does not significantly increase the chance of false negative decisions since the signature is simple and the authentic account user will likely be able to produce a consistent signature.

Thus, it is seen that a system and method for check fraud detection and prevention is provided. One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

What is claimed is:

1. A computer program for preventing check fraud using signature validation, the computer program comprising:
   machine readable instructions for creating a fingerprint containing machine-readable data corresponding to authorized account signatures, the fingerprint comprising a on-dimensional skeletonized version of the authorized account signatures;
   machine readable instructions for encoding the fingerprint into a barcode; and
   machine readable instructions for printing the barcode on a document.

2. The computer program of claim 1, wherein the fingerprint represents integral characteristics of all valid account signatures.

3. The computer program of claim 1, wherein the fingerprint identifies a person-specific confidence threshold for each account user.

4. The computer program of claim 1, wherein the fingerprint is created using a signature encoding algorithm that converts account signature images into a machine-readable data string.

5. The computer program of claim 1, wherein the account signatures are compared against the fingerprint at a point of presentment.

6. The computer program of claim 1, wherein the document is a check.

7. A computer program for preventing check fraud using signature validation, the computer program comprising:
   machine readable instructions for creating a one-dimensional fingerprint containing machine-readable corresponding to authorized account signatures;
   machine readable instructions for evaluating the topology of each account signature;
   machine readable instructions for encoding the fingerprint into a barcode; and
   machine readable instructions for printing the barcode on a check.

8. The computer program of claim 7, further comprising machine readable instructions for determining a person-specific confidence threshold for each account signature based upon the topology of each account signature.

9. The computer program of claim 7, wherein the machine readable instructions for evaluating the topology of each account signature are used to determine the number of connected components in each signature.

10. The computer program of claim 9, wherein the machine readable instructions for evaluating the topology of each account signature are used to determine the number of holes in connected components for each signature.

11. The computer program of claim 9, wherein the machine readable instructions for evaluating the topology of each account signature are used to determine the size of connected components of each signature.

12. The computer program of claim 7, wherein the machine readable instructions for evaluating the topology of each account signature are used to build a list of all critical points, including positions and topological indices.

13. The computer program of claim 7, further comprising machine readable instructions for determining signature complexity using a weighted sum of topological features.

14. The computer program of claim 7, wherein the fingerprint represents integral characteristics of all valid account signatures.

15. A computer program for preventing check fraud using signature validation, the computer program comprising:
    machine readable instructions for creating a one-dimensional fingerprint containing machine-readable data corresponding to authorized account signatures;
    machine readable instructions for evaluating the topology of each account signature;
    machine readable instructions for encoding the fingerprint into a barcode;
    machine readable instructions for printing the barcode on a check; and
    machine readable instructions for determining a person-specific confidence threshold for each account signature based upon the topology of each account signature.

16. The computer program of claim 15, wherein the machine readable instructions for evaluating the topology of each account signature are used to determine the number of connected components in each signature.

17. The computer program of claim 16, wherein the machine readable instructions for evaluating the topology of each account signature are used to determine the number of holes in connected components for each signature.

18. The computer program of claim 16, wherein the machine readable instructions for evaluating the topology of each account signature are used to determine the size of connected components of each signature.

* * * * *